Figure 1:
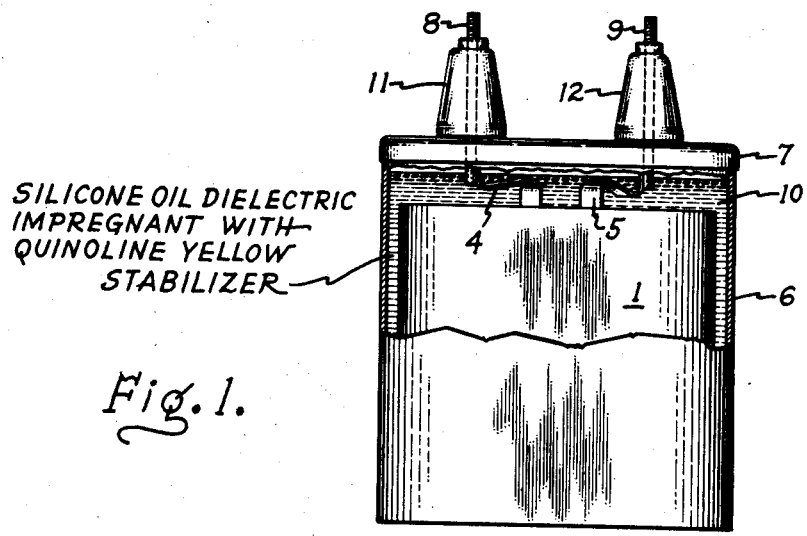

Aug. 11, 1959

J. E. PETLEY 2,899,614

STABILIZED ORGANO-SILOXANE COMPOUNDS AS
DIELECTRIC MATERIAL IN CAPACITORS

Filed March 12, 1957

Inventor,
Joseph E. Petley,
by Gilbert P. Tarleton
His Attorney.

2,899,614

STABILIZED ORGANO-SILOXANE COMPOUNDS AS DIELECTRIC MATERIAL IN CAPACITORS

Joseph Edward Petley, Troy, N.Y., assignor to General Electric Company, a corporation of New York Application March 12, 1957, Serial No. 645,491

4 Claims. (Cl. 317—259)

The present invention relates to improvements in electrical devices, and more particularly to improved dielectric material which is particularly useful for capacitors and suitable for other electrical devices such as transformers, cables, switches, fuses, reactors, circuit breakers, and the like.

As compared to the usual types of dielectric liquids such as mineral oil and halogenated hydrocarbons used heretofore for the above types of electrical devices, silicone oils have been found to offer several advantages as dielectric media, and particularly alkyl and aromatic organo-siloxanes have properties making them especially suitable for such purposes. Organo-siloxanes are compositions having silicon atoms joined together by oxygen atoms through silicon-oxygen linkages, thus,

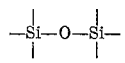

and having organic radicals attached by carbon-silicon linkages to at least some of the silicon atoms. The advantages of organo-siloxanes as dielectric liquids lie in the fact that they are in general non-hydrolyzable, substantially non-hygroscopic and maintain their high dielectric strength and other excellent electrical properties under conditions in which other types of dielectric liquids break down.

It has, however, been observed that the organo-siloxanes tend to lose their good electrical insulating properties under conditions of elevated temperature and chemical and electrochemical action (as distinguished from oxidation effects) such as occur in the use of these compounds in air-tight electrical devices of the above type, and especially in hermetically sealed capacitors. Under these conditions, the organo-siloxane compounds are susceptible to deterioration, leading to premature breakdown of the electrical device in which they are used, as, for example, the short circuiting of a capacitor.

It is an object of the present invention to provide an improved dielectric liquid of organo-siloxane composition for use in electrical devices of the above type.

It is another object of the invention to provide hermetically sealed electrical devices, and especially capacitors, which incorporate dielectric material of organo-siloxane composition and which have improved stability and increased life under a wide variation of thermal and electrical conditions.

It has been found, in accordance with the invention, that organo-siloxane compounds are effectively stabilized in their function as dielectric materials by the incorporation therein of a relatively small quantity of quinoline yellow, the thus stabilized organo-siloxane liquid exhibiting substantially prolonged life characteristics and improved stability to thermal, chemical and electrochemical influences.

Figure 2:
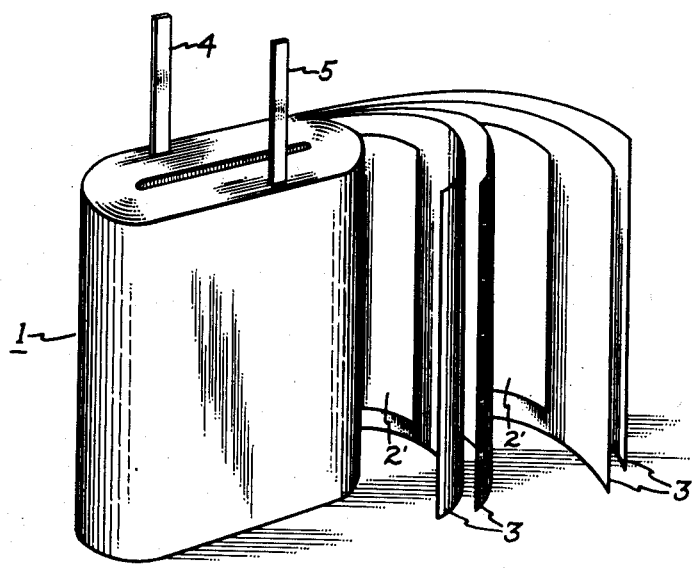

The invention will be better understood from the following description taken in conjunction with the accompanying drawing in which:

Fig. 1 is a partially cut away elevational view of a sealed roll type capacitor to which the present invention is applicable; and Fig. 2 is a perspective view of the wound capacitor section of the Fig. 1 device showing the section partially unrolled.

Referring to the drawing, there is shown a capacitor comprising a rolled capacitor section 1 made up in conventional arrangement of wound alternate layers of metal foil 2, 2' and dielectric sheet material 3. The metal foils 2, 2' serve as the capacitor electrodes or armatures and may be composed of aluminum, copper, lead, tin or any other known or suitable types of capacitor electrode material. Instead of separate foil and insulation sheets, a sheet of metallized paper or equivalent material could be used to form the capacitor roll. Electrical contact with the armatures 2, 2' is made by means of tap straps, 4, 5 of conducting material which project from the end of capacitor section 1. The interleaved dielectric spacers 3 may be composed of a single sheet or a plurality of sheets ranging in thickness from 0.2 to 5 mils and preferably consist of cellulosic material such as kraft paper, although other dielectric materials such as sheets of reconstructed mica, synthetic resins, or other known or suitable type of dielectric material may be used. In accordance with known practices, the wound capacitor roll section 1 is placed in the capacitor casing 6 and thereafter impregnated with the stabilized organo-siloxane dielectric liquid 7 of the composition hereinafter described which is introduced into and substantially fills the casing 6 and any voids in the capacitor roll section. The finished capacitor is provided with a cover 10 hermetically sealing the interior of the casing, and external terminals 8 and 9, respectively connected to tap straps 4 and 5, are mounted on cover 10 by means of bushing insulators 11 and 12, or the like.

The silicone dielectric compounds which may be stabilized in accordance with the invention include both alkyl and aromatic organo-siloxanes. Such organo-siloxanes include compounds having organic radicals attached to the silicon atom through carbon-silicon linkage. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc., aryl and alkaryl radicals such as phenyl, mono- and poly-alkyl phenyls as tolyl, xylyl, mesityl, mono- di-, and tri-ethyl phenyls, mono-, di-, and tri-propyl phenyls, etc.; naphthyl, moon- and poly-alkyl naphthyls as methyl naphthyl, diethyl naphthyls, tri-propyl naphthyl, etc., tetra-hydronaphthyl, anthracyl, etc.; aralkyl such as benzyl, phenylethyl, etc.; alkenyl such as methallyl, allyl, etc., and heterocyclic radicals. The above organic radicals may also, if desired, contain inorganic substituents such as halogens, etc. Examples of such organo-siloxanes which have proved particularly suitable are methyl siloxane, ethyl siloxane, propyl siloxane, amyl siloxane, phenyl methyl siloxane, phenyl ethyl siloxane, and derivatives thereof. Also, there may be present inorganic radicals such as hydroxyl, halogen, alkoxy, and the like attached to the silicon atom.

The stabilizer of the present invention is especially effective when used in siloxanes which have an average of approximately one to approximately two organic radicals per silicon atom. Such liquid organo-siloxanes when used as dielectric liquids in closed containers, and especially in hermetically sealed capacitors such as tested under the conditions described in the examples set forth below, are particularly subject to thermal, chemical and electro-chemical degradation and undesirable changes in electrical properties resulting therefrom.

A particular type of silicone oil which has been found suitable as a dielectric liquid is dimethyl or methyl phenyl siloxane polymer, having the following chemical structure:

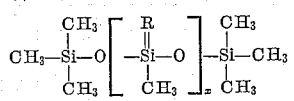

where R is a methyl or phenyl group and $x$ denotes the number of dimethyl siloxane or methyl phenyl siloxane repeating units.

Particular compositions of silicone oil of the above type which has been found especially satisfactory have the following characteristics:

|  | SF-96-40 | SF-96-100 |
| --- | --- | --- |
| Viscosity at 100° F.: |  |  |
| Centistokes | 40 | 100 |
| SSU | 189 | 460 |
| Pour point ° C. maximum | −54 | −53 |
| Specific gravity 20/20° C. | 0.964 | 0.965 |
| Flash point ° C. | 315 | 320 |
| Auto Ignition Temp. ° C. |  | 440 |
| Expansion coefficient per ° C. × 10⁻⁴ | 9.80 | 9.68 |
| Volume resistivity 500 V.D.C., 100° C. ohm-cm. min. | 100×10¹² | 100×10¹² |

The SF-96-100 compound represents a dimethyl siloxane of the above structural formula wherein $x$ is approximately 90.

In accordance with the invention, it has been found that the addition to the silicone dielectric liquid of a material known as quinoline yellow, also known as Resoform Yellow 3G pure and as Quinophthalone, Color Index No. 800, will prolong to an unexpected degree the life of capacitors in which such stabilized silicone oil dielectric liquids are incorporated. This stabilizing compound has the following structural formula:

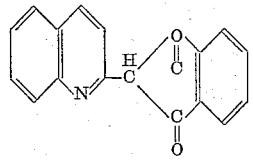

It is preferred, in accordance with the invention, to use the above-described stabilizer substance as an additive in traces or very small amounts in the dielectric silicone liquid. It has been found that amounts of quinoline yellow in the range of about .01–5% by weight based on the dielectric liquid are satisfactory, and in particular the range of .05–1.0% has proved exceptionally satisfactory.

The incorporation of the stabilizing compound in the silicone oil dielectric liquid was found, as a result of extensive tests, either to have no significant effect on the initial electrical characteristics of the dielectric liquid, viz., insulation resistance, power factor and capacitance, or somewhat to improve these properties.

Aging tests were made on a number of sealed capacitors having wound sections for the purpose of determining the effect on life and electrical characteristics of the capacitors by the stabilizer employed in accordance with the invention. In these experiments, capacitors were used having the following design: 3 sheets of 0.0004 inch kraft paper with 0.00025 inch aluminum foil electrodes and with an effective area of 7.78 square feet having a nominal capacity of about 0.76 mfds.

It is to be understood that the following examples are given for the purpose of illustration only and are not to be interpreted as limiting the scope of the invention in any way:

*Example I*

This control test was made on three hermetically sealed capacitor units of the above construction having a dielectric liquid of methyl polysiloxane without a stabilizer, the silicone oil used in this test having a composition corresponding to that of the SF-96-40 material described above. The control units were subjected to a life test under the conditions of 85° C. and 1500 volts D.C., and in this test the average life of the units was found to be 608 hours. Similar control units subjected to 125° C. and 1000 volts D.C. had an average life of less than 100 hours.

*Example II*

This series of tests was conducted to determine the effect of the present quinoline yellow stabilizer compound on a commonly used dielectric liquid composed of a chlorinated diphenyl compound. A number of capacitor units of the above construction impregnated with such a stabilized dielectric composition, when subjected to the conditions of 125° C. and 1000 volts D.C., were found to have an average life of about 500 hours. When a group of capacitor units having the same type of chlorinated diphenyl dielectric liquid incorporating 0.5% of quinoline yellow were subjected also to the conditions of 125° C. and 1000 volts D.C., the average life in this case was found to be about 270 hours, showing a marked detrimental effect of the quinoline yellow as an additive in this type of dielectric liquid.

*Example III*

A number of capacitor units of the above construction incorporating the same methyl polysiloxane dielectric liquid as in Example I but incorporating 0.1% by weight of quinoline yellow when subjected to 85° C. and 1500 volts D.C. showed on the average over 6000 hours of effective life. A further group of similar capacitors incorporating similarly stabilized methyl polysiloxane liquid when treated at 125° C. and 1000 volts D.C. had an average life of over 5700 hours.

From the above test data, it is apparent that the stabilizer compound employed in accordance with the invention for silicone oil impregnated capacitors is extremely beneficial to the aging characteristics of such capacitors. Under one set of testing conditions, the stabilized capacitors showed average life of about 10 times the life of unstabilized capacitors, whereas under the other set of conditions an improvement of over 57 times the life of the unstabilized units was produced. This remarkable increase in the life of capacitors stabilized in accordance with the invention as demonstrated by the above tests was quite unexpected, particularly in view of the results of Example II wherein not only no improvement in aging was found, but actually poorer life characteristics were produced by incorporating the same stabilizer substance in a different type of dielectric liquid.

The following process is illustrative of the method of making capacitors incorporating the stabilized silicone oil dielectric in accordance with the invention. The wound unimpregnated capacitor section is initially placed in the capacitor casing, the leads attached and the cover placed in position and hermetically joined to the casing. The bottom of the casing or the cover is provided with a fill hole through which the dielectric liquid may be introduced. The liquid silicone oil impregnant, prepared by the addition thereto of about .15% of quinoline yellow, a yellow crystalline material, is introduced into the capacitor casing after the latter has been vacuum treated at about 135° C. The units are allowed to continue under vacuum soak at about 135° C. for several hours, after which the thus impregnated units are allowed to cool under vacuum and then fluid-tightly sealed with solder or other suitable sealing means.

It is not fully understood why the quinoline yellow material has the markedly beneficial stabilizing effect above demonstrated, but it is presumed that the stabilizer functions by fixing or removing metallic ions produced in the hermetically sealed capacitors under operational conditions of high electrical stress and elevated temperature. The stabilizer may also fix free radicals produced by the electrochemical decomposition of the silicone oil dielectric liquid under such operational conditions. However, in spite of the reactions which presumably take place in the dielectric stabilizing action, it seems clear that the quinoline yellow does not adversely affect the electrical properties of the capacitor, as frequently occurs in the case of other types of stabilizing materials. The quinoline yellow material is of advantage further in being readily available, and being effective even in extremely small quantities, and provides an economical means of markedly extending the life of capacitors.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical device comprising, in combination, electrical conducting means, and dielectric material in contact with said conducting means, said dielectric material consisting essentially of a liquid organo-siloxane compound containing a minor proportion of quinoline yellow, the amount of quinoline yellow present being sufficient to stabilize the dielectric material against deterioration under electrical stress and elevated temperature conditions.

2. An electric capacitor comprising, in combination, cooperating metallic armatures and a dielectric liquid interposed between said armatures, said dielectric liquid consisting essentially of a liquid organo-siloxane compound containing a minor proportion of a stabilizer substance consisting of quinoline yellow, the amount of quinoline yellow present being sufficient to stabilize the dielectric material against deterioration under electrical stress and elevated temperature conditions.

3. An electric capacitor comprising, in combination, a pair of metal electrodes and a paper spacer therebetween, said paper spacer being impregnated with a dielectric liquid consisting essentially of a liquid organo-siloxane compound and about .01–5% by weight of quinoline yellow.

4. A dielectric composition composed of a liquid organo-siloxane compound and about 0.01–5% by weight of a stabilizer consisting of quinoline yellow.

References Cited in the file of this patent

UNITED STATES PATENTS

| | | |
|---|---|---|
| 2,389,804 | McGregor | Nov. 27, 1945 |
| 2,802,017 | Frost | Aug 6, 1957 |

OTHER REFERENCES

Mitra: "Zeitschrift für Physikalische Chemie" (1952), vol. 199, pp. 191–5.

UNITED STATES PATENT OFFICE

CERTIFICATE OF CORRECTION

August 11, 1959

Patent No. 2,899,614

Joseph Edward Petley

It is hereby certified that error appears in the printed specification of the above numbered patent requiring correction and that the said Letters Patent should read as corrected below.

Column 2, line 51, for "moon" read -- mono --; column 3, lines 7 to 10 inclusive, for that portion of the formula reading

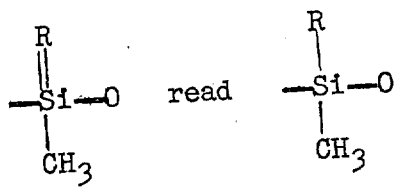

line 39, the upper "C=O" should be arranged with the "C" on the ring and not the "O" as shown in the patent.

Signed and sealed this 1st day of March 1960.

(SEAL)
Attest:
KARL H. AXLINE
Attesting Officer

ROBERT C. WATSON
Commissioner of Patents